United States Patent [19]

Lundahl et al.

[11] Patent Number: 4,908,658
[45] Date of Patent: Mar. 13, 1990

[54] BURN-OUT FRAME FOR A COPY PRINT MACHINE

[75] Inventors: Lief Lundahl, Stockholm; Christer Wikstrom, Lidingö, both of Sweden

[73] Assignee: Misomex Aktiebolag, Hagersten, Sweden

[21] Appl. No.: 249,879

[22] Filed: Sep. 27, 1988

[30] Foreign Application Priority Data

Nov. 19, 1987 [SE] Sweden ............................ 87045621

[51] Int. Cl.$^4$ ........................ G03B 27/62; G03B 27/64
[52] U.S. Cl. ......................................... 355/76; 355/91
[58] Field of Search .................... 355/72, 73, 74, 76, 355/91, 93, 94, 122

[56] References Cited

FOREIGN PATENT DOCUMENTS 909571 9/1972 Canada ................................. 355/72
150372 8/1981 German Democratic Rep. ... 355/74

Primary Examiner—L. T. Hix
Assistant Examiner—Brian W. Brown

[57] ABSTRACT

The present invention describes a burn-out frame for a copy print machine, comprising a support table on which a film or a printing plate is intended to be mounted, and a copy print frame having exposure light for providing a print of one and the same original film or a series of different original films onto the film or printing plate, and in which the print frame comprises a frame having a transparent glass plate (11), which at the bottom surface thereof is formed with at least one downwardly opening groove (12, 14) for vacuum connecting an original film (13) and eventually a masking film (15), and one or more bores and/or channels (16, 17) opening in said groove (12) for connecting the vacuum groove(s) (12) to a source of sub-pressure, and in which part (19) of the print frame glass corresponding to the largest image area of the original film (13) is clear, and parts (18) of the transparent plate located outside said largest image area are diffused.

In order to prevent refractions of light resulting from the vacuum grooves and the bores from falling onto the film or printing plate while at the same time allowing a non-image area of said film or printing plate to be exposed or burnt out.

7 Claims, 2 Drawing Sheets (känd teknik)

BURN-OUT FRAME FOR A COPY PRINT MACHINE

BACKGROUND/SUMMARY OF THE INVENTION

The present invention generally relates to an improvement in a step and repeat (copying) machine. What is meant by a step and repeat machine is a copying machine having a support table, on which a composite film or a printing plate is intended to be mounted, and a printing frame, which is movable over said support table and which has an exposure light means, and which printing frame can be moved to different positions over the composite film or the printing plate and provide a printing at said several different positions of one and the same film original or a series of different film originals. (By original is meant the negative or positive film having text and pictures and intended to be printed onto a composite film, a printing plate etc.)

In such a copying machine composite films or printing plates are prepared, for instance a film or plate for printing of a predetermined number of pages of a book, a newspaper, a catalogue etc. Thereby it is important that the impositioning of the pages is correct, so that the pages take the correct position on the composite film or the printing plate, and that all parts of the film or plate round the entire double page which do not exhibit an image are eliminated.

The invention is in the first place useful for so called positiv printing (copying), that is a printing in which the exposure light is intended to "burn out" the parts of the composite film or the printing plate which wear no images, whereas the image parts are remained after the exposure and the development of the film or the plate. The invention also may be utilized, however, for negative printing and for other purposes.

When copy printing original films by means of a step and repeat print machine it has been usual to use a printing frame having a glass plate which is, at the bottom surface thereof, formed with vacuum channels intended to vacuum (suction) connect an original film, which in connection to the printing thereof onto a composite film or a printing plate is put into intimate contact therewith, whereupon the exposure light is lit on and the original film is printed on the composite film or the printing plate.

In order to avoid illumination and light damaging of the parts of the composite film or the printing plate located outside the original film, and on which parts other original films are to be printed in the succeeding printing steps it has been usual to use a masking frame (or several masking frames), consisting of a non-transparent material, generally metal, and generally having a central opening the form and size of which corresponds to the intended area of exposure, which area varies depending on the size of the image presenting part of the original film.

The image free parts between the printing pages can easily be exposed off in that the original film is made slightly "bleeding" or larger than the image presenting surface, however not of such large size as to influence the image presenting parts of the adjacent pages. According to this method it is, however, not possible to exposure off (or burn out) the parts of the composite film or the printing plate corresponding to the free areas outside the corner pages or edge pages. This has to be done in a separate operation, whereby the previously exposed areas are masked over and the outer, still non-exposed, areas (the edges) of the composite film or the plate are exposed.

The object of the invention is to suggest a method of making any necessary exposures in one and the same operation, which means both to expose the original film and to "burn-out" (remove) the parts of the composite film or the printing plate facing outwardly towards the edges of the composite film or the printing plate.

According to the invention this is made in that the entire printing frame is made of a transparent material like glass or plastic, and in that the printing frame is, at the bottom surface thereof, formed with channels for vacuum receiving both an original and a masking film which, for the pages which are to be printed at the outermost areas of the composite film or the printing plate, cover only the inwardly facing parts, whereas said masking film leaves the outwardly facing edge or edges free for illumination, whereby consequently said outer areas of the positive composite film or plate are exposed or "burnt out" at the same time as the original film is exposed. The advantages of said printing method is that the composite film or plate can be prepared in one single process step.

In may happen, however, that the vacuum channels for vacuum connecting the original film and the masking film and provided at the bottom surface of the printing machine glass give shadows of the generally sharp exposure light and present lines or other formations on the composite film or the printing plate. For eliminating this problem it has been found necessary to arrange for such a diffusing or other modification of this part of the light passing the glass plate that shadown phenomenas are avoided at the same time as the light passing the glass plate for printing the original film onto the composite film is left uninfluenced and strong and sharp.

Therefore, according to a preferred embodiment of the invention, the parts of the glass plate located outside the image carrying area of the original film are made frosted for diffusing purposes, preferably in that the upper surface of the glass of the print machine is blasted.

It may happen that the blasted or otherwise frosted surface becomes worn by time, or that the blasting surface becomes wet at some place, so that the light passes un-diffused also through said worn or wet part, whereby the vacuum channels at the bottom surface of the glass may still give shadows. For protecting the frosted surface a cover plate of a clear, transparent material can be glued or otherwise attached on top of the printing glass. This is in particular advantageous in that the connection bores or grooves for the vacuum channels at the bottom surface of the printing glass can be cut in the form of open grooves at the upper surface of the printing glass, which grooves are sealed by the cover glass. Preferably the frosting is made at the bottom surface of the cover glass in order to completely cover the frosting of the surfaces which have no images and whereby said frosting is protected against any action.

As an alternative to frosting of the glass surface a frosting-foil can be mounted on the upper surface of the print glass or between the cover glass and the print glass. It may also be advantageous to provide the frosting foil in the form of a double-sticking tape foil which serves, at the same time, also to join the print glass and the cover glass.

It is obvious that there should be a special print frame having a glass clear print opening of special form and size for each format of the image supporting surface, and that the vacuum channels provided at the bottom surface of the print glass should be adapted to the actual format of the original film and of the masking film.

Now the invention is to be described more closely with reference to the accompanying drawings. It is, however, to be understood that the embodiments of the invention described and illustrated in the following are only illustrating examples, and that many variations and modifications may be presented within the scope of the appended claims.

DETAIL DESCRIPTION OF THE PREFERRED EMBODIMENTS

Figure 1:
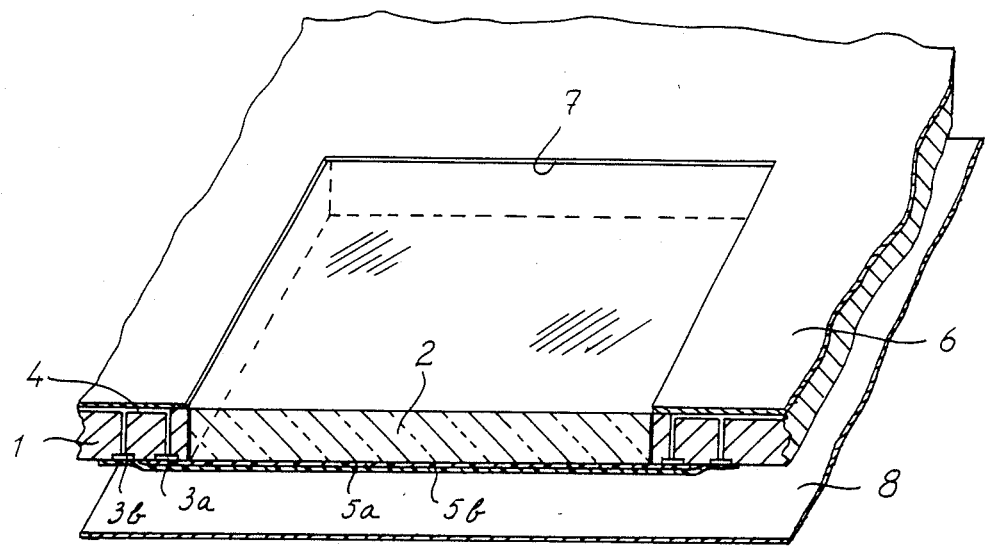
FIG. 1 diagrammatically shows a cross section of a copy print frame of a "step and repeat" copying machine of known type.

In previously known "step and repeat" copying machines of the above mentioned type, the print frame, which is shown in FIG. 1, generally comprises a vertically up and down movable metal frame 1 carrying a glass plate 2 and having vacuum grooves 3a, 3b at the bottom surface of the metal frame 1, which grooves are connected to a source of sub-pressure over connection channels 4. The vacuum grooves 3a, 3b vacuum connect a masking film 5a and an original film 5b to the bottom surface of the metal frame 1. On the top surface of the metal frame 1 there is a cover plate 6 of a material like a PVC-resin, which plate covers and seals the connection channels 4 and which has a recess 7, the form and size of which corresponds to the intended size of the page to be printed to a composite film 8, or to the intended image area of the of the original film 5b. When the print frame together with the original film 5b which is vacuum connected thereto has been brought into contact with the composite film 8 or the printing plate mounted on the support table a light source (not illustrated) is illuminated and the light source projects a light beam to the print frame. The light passing through the recess 7 of the print frame makes the text and/or images of the original film 5b print onto the composite film 8. The light falling outside the recess 7 is stopped by the cover plate 6 which prevents the light from exposing or burning out the corresponding photosensitive material of the composite film 8. Such unexposed material located outside the recess 7, which has to be removed before the composite film or the printing plate can be used, must be exposed or burnt out in a succeeding operation by a new exposing, whereby the previously exposed parts have to be correspondingly masked off.

Figure 2:
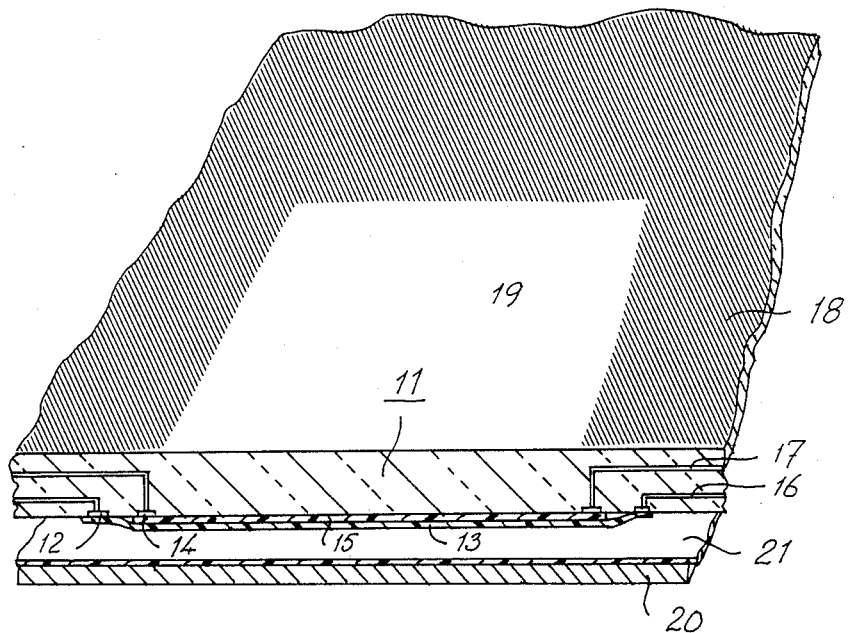
FIG. 2 correspondingly shows a print frame according to the invention.

The print frame diagrammatically shown in FIG. 2 is intended for exposing according to the so called "positive method," whereby a light beam exposes or burns out the parts of the composite film or printing plate which have no images. The print frame comprises a transparent plate 11, made of for instance an acrylate material like PLEXIGLAS which glass is preferably not UV protective. The bottom surface of the transparent plate 11 is formed with at least two sets of vacuum grooves, an outer groove 12 for vacuum connecting an original film 13 and an inner groove 14 for vacuum connecting a masking film 15.

With the positive method of printing as shown in FIG. 2 there is normally no need for a masking film since the exposure has to be made to the edges of the composite film or printing plate. However, in order to make it possible to use the same printing, frame is also for negative printing the frame preferably formed with means 12, 14, 16, 17 for vacuum connecting a masking film.

The two sets of grooves 12 and 14 are connected to a source of subpressure (not shown) over channels 16 and 17. As shown in FIG. 2 the grooves 12 for the original film must be located outside the outer edges of the masking film 15. For practical reasons the grooves 12 and 14 are provided rather close to each other. The upper surface of the print glass 11 is formed light diffusing, for instance frosted or blasted over a surface 18 outside the glass clear surface 19 of the original film. The object of frosting the surface 18 is to provide a light-diffused light beam passing the glass for eliminating the risk of appearance of shadows and following lines on the composite film depending on light refraction phenomenas from the vacuum grooves 12 and 14 and from the connection channels 16 and 17.

A portion 18 of the top surface of the transparent plate 11 is made to diffuse light. This can be done, for example, by frosting or blasting a portion of the transparent plate. This diffused portion 18 surrounds a clear portion 19 which corresponds to the original film. The object of frosting the portion 18 is to eliminate the risk of shadows and following lines falling onto the composite film 20, these shadows and lines resulting from light refraction from the vacuum groove 12 and 14 and from the connection channels 16 and 17.

The original film 13 is printed on the composite film or printing plate 20 while at the same time, the portions of the composite film 20 located outside the original film, except for parts which are masked by means of the masking film 15, are exposed or burnt out. Therefore, in this case there is no need for an additional illumination step for burning out the parts located outside the original film. It should be noted that the light opening of the copy print frame has to be at least large enough to allow the light to reach the edges of the composite film or printing plate, so that no unexposed areas are left adjacent the said edges.

The apparatus shown in FIG. 2 has been described with reference to printing of one single image (page) on the composite film, but normally several images are printed on the composite film and in such cases a further mask must be used for protecting the adjacent areas of the composite film, onto which said further images are to be printed.

Figure 3:
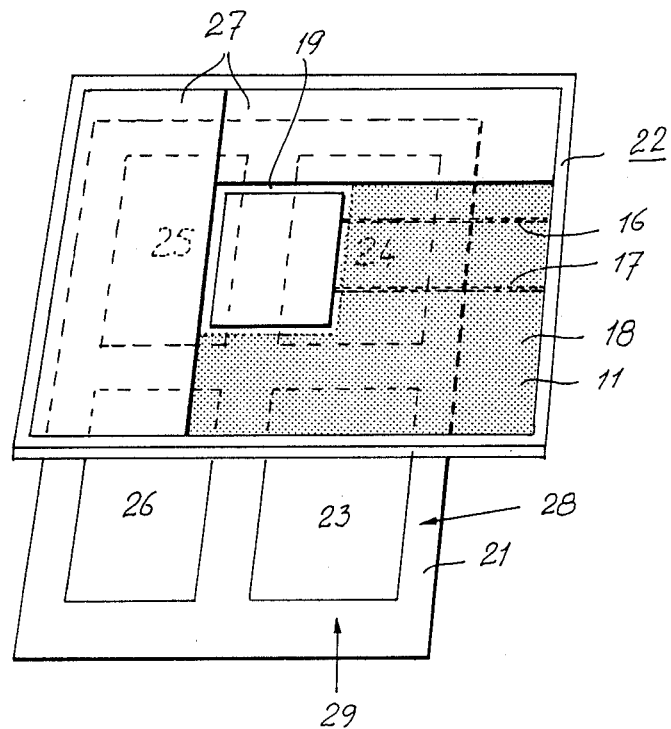
FIG. 3 is a perspective view seen obliquely from above, of a print frame according to the present invention.

Such an apparatus is diagrammatically shown in FIG. 3. A composite film 21 is mounted on a support table, and over said film 21 there is provided a printing unit comprising a printing frame 22 including a not illustrated lighting means, and an original magazine and an original exchanging device etc., which means are movable in two mutually perpendicular directions (the X- and the Y-direction) for exact positioning of the print frame in four illustrated positions 23, 24, 25 and 26, respectively corresponding to four different print pages.

In FIG. 3 the print frame is shown ready to print page 23 at the lower right corner of the composite film 21. The transparent plate 11 is of the same type as shown in FIG. 2, and on top of the transparent plate 11 there is a mask or curtain 27 which allows an illumination and exposure of only the image area 23 and bordering area 28, 29. All other parts of the composite film are left unexposed.

The original film in the print frame 22 for page 23 is now exchanged for the original film for page 24, and the print frame is moved in the Y-direction to an exact position over the page area 24 of the composite film corresponding to the intended position for said print page, and the mask or the curtain 27 is moved so that an exposure can be made both of the print page 24 and also of the edge above and the edge aside of said page 24, whereas the remaining parts of the composite film are screened from illumination by the mask.

As described above, page by page can be printed whereby the page image is printed and the parts outside the page image, which do not or should not have an image, are burnt out (exposed).

Figure 4:
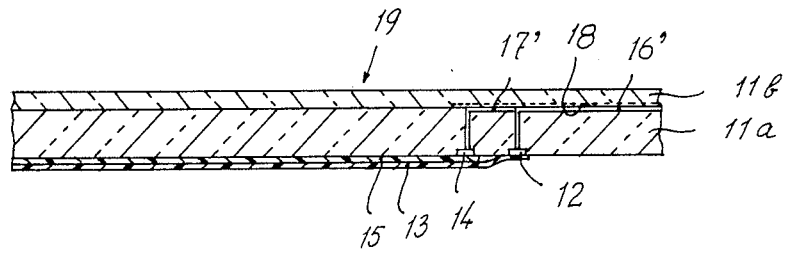
FIG. 4 shows a cross section through a modified print frame according to the invention.

FIG. 4 fragmentarily shows a practical embodiment of a print frame according to the invention. The print frame comprises a base plate 11a of a transparent material, for instance glass, acrylic resin (without UV protection) or a similar plate, and a cover plate 11b of the same or a similar transparent material. At the bottom surface of the base plate 11a there are outer vacuum grooves 12 for holding an original film 13 and inner vacuum grooves 14 for holding a mask film 15. Bores are drilled from the grooves 12 and 14 up to the upper surface of the base plate, from which points channel forming grooves 16' and 17' resp. extend to the edges of the plate. It is intended that the cover plate 11b should cover and seal the top of the channel grooves 16' and 17'. Thereby said vacuum channels can be made simply. Thereby said vacuum channels can be made simply.

The cover plate 11b is blasted or otherwise frosted over the areas 18' outside the glass clear area 19 adapted for exposure of the original film, and the cover plate 11b is, by means of a glue joint, a double sticking tape or a similar means, secured on top of the base plate 11a with the frosted part 18' of the cover plate facing the base plate 11a. Thereby the frosted part protects against such handling that might cause shadows of the vacuum grooves and/or the vacuum channels on the composite film.

Instead of frosting, blasting, or etching, the bottom surface of the cover plate, it is possible to place a frosted or opal coloured tape between the base plate and the cover plate, or alternatively on top of the cover plate. Alternatively it is also possible to use a frosted or opal coloured double sticking tape for joining the base plate and the cover plate.

We claim:

1. Burn-out frame for a copy print machine, said burn-out frame comprising:
   a support table on which a film or printing plate is intended to be mounted, said film or printing plate having an image area and a non-image area; and
   a copy print frame having an exposure light and one or more original films, said copy print frame providing a print of said one or more original films onto said film or printing plate, each of said one or more original films having an original image area and an original non-image area outside of said original image area;
   said copy print frame further comprising a transparent plate, said transparent plate (11;11a,11b) having a bottom surface, a top surface, an intermediate surface, a clear portion, and a light-diffused portion, said intermediate surface being located between said bottom surface and said top surface,
   said bottom surface of said transparent plate being formed with at least one downwardly opening groove (12) for vacuum connecting said one or more original films (13) to said transparent plate,
   said transparent plate also having one or more bores or channels (16,17) coupled to said vacuum groove(s) (12) for further coupling said vacuum groove(s) (12) to vacuum means for providing a vacuum to said vacuum grooves,
   said transparent plate (11;11a,11b) being larger than one of a plurality of predetermined standard sizes of said one or more original films (13), and
   said clear portion of said transparent plate corresponding in size and location to said original image area of said one or more original films, and said light-diffused portion of said transparent plate being located on said intermediate surface of said transparent plate and corresponding in size and location to said original non-image area of said one or more original films,
   whereby said transparent plate allows said non-image area of said film or printing plate to be exposed to light, thus resulting in said non-image area of said film or printing plate being burnt out.

2. Burn-out frame according to claim 1, wherein said light-diffused portion of said transparent plate is opalized or frosted, by blasting or etching, in order to eliminate any shadows which fall onto said film or printing plate (21) resulting from light detraction from said vacuum groove(s) (12) and said bores or channels (16, 17).

3. Burn-out frame according to claim 1, wherein said light-diffused portion of said transparent plate comprises a lustreless foil or tape.

4. Burn-out frame according to any of the preceding claims, wherein said transparent plate further comprises a base plate (11a) and on top thereof a tightly connected cover plate (11b), and said light-diffused portion is formed on said cover plate (11b).

5. Burn-out frame according to claim 4, wherein said bores or channels (16', 17') are formed by grooves in said base plate (11a), said grooves being covered by said cover plate (11b) to form longitudinal bores.

6. Burn-out frame according to claim 1 intended for stepwise printing of several original films (13) onto said film or printing plate (21), wherein said copy print fame (22) is movable in at least two directions perpendicular to each other, and said copy print frame is formed with masking means (27) for masking off a number of said several original films which are not to be illuminated during printing of a selected one of said several original films.

7. Burn-out frame according to claim 6, wherein said masking means for masking said original films comprise movable masking plates or curtains (27) which can be adjusted for masking any optional area within said copy print frame.

* * * * *